Figure 3:
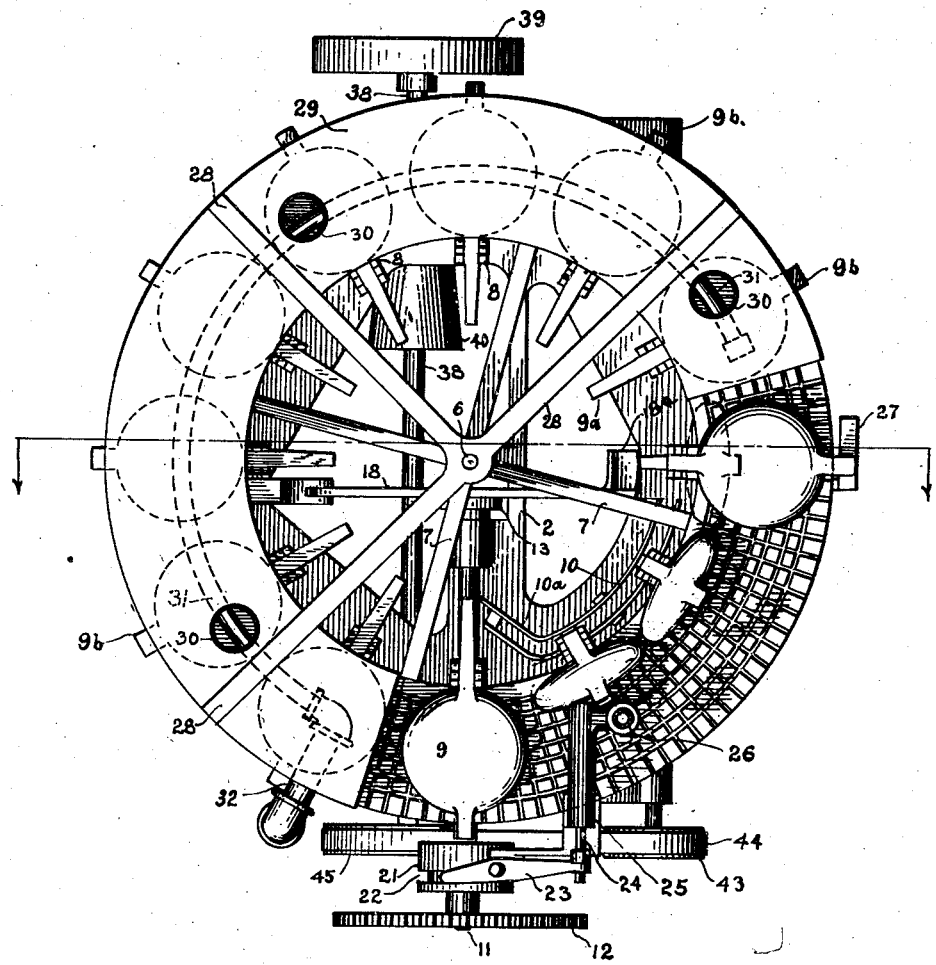

W. W. TURNBULL.
BAKING MACHINE.
APPLICATION FILED DEC. 15, 1910.
1,009,355.
Patented Nov. 21, 1911.
3 SHEETS—SHEET 1.
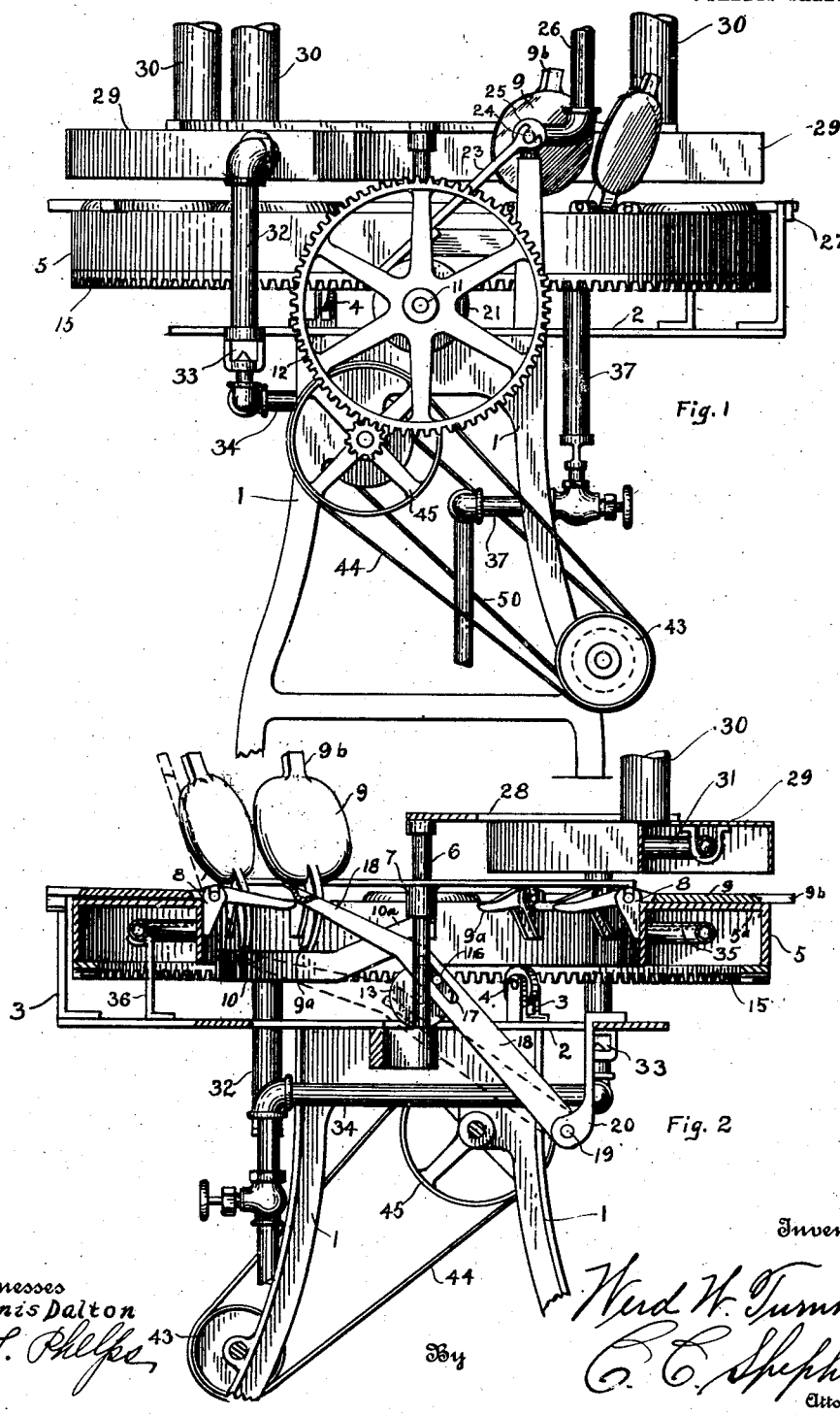

W. W. TURNBULL.
BAKING MACHINE.
APPLICATION FILED DEC. 15, 1910.

1,009,355.

Patented Nov. 21, 1911.
3 SHEETS—SHEET 2.

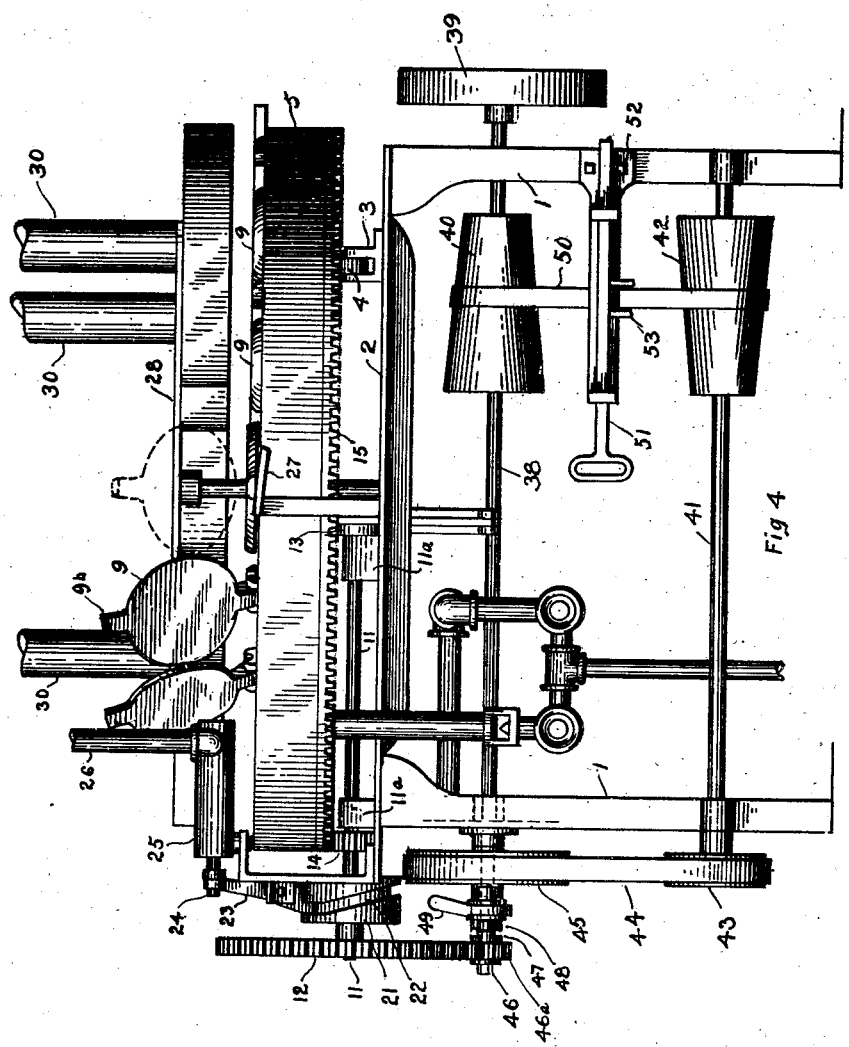

UNITED STATES PATENT OFFICE.

WERD W. TURNBULL, OF COLUMBUS, OHIO.

BAKING-MACHINE.

1,009,355.  Specification of Letters Patent.  Patented Nov. 21, 1911.

Application filed December 15, 1910. Serial No. 597,550.

*To all whom it may concern:*

Be it known that I, WERD W. TURNBULL, a citizen of the United States, residing at Columbus, in the county of Franklin and State of Ohio, have invented certain new and useful Improvements in Baking-Machines, of which the following is a specification.

My invention relates to an improvement in baking machines and the objects of my invention are to provide an improved construction of baking machine particularly adapted for the baking of cake-like products, such as are adapted for the making of ice cream cones; to provide an improved machine of this class so constructed as to obviate the necessity of inverting the baking plates during the baking operation; to provide an integrally formed baking ring or table; to provide improved means for automatically raising and lowering the movable baking plates; to provide improved means for heating the batter contained on the lower baking plate from both the upper and lower side thereof, and to otherwise produce a simple, inexpensive and effective baking mechanism by the use of which ordinary batter will be readily converted into baking products. These objects I accomplish in the manner illustrated in the accompanying drawings—in which:

Figure 1 is a side elevation of my improved machine, Fig. 2 is a sectional view on line $x$—$x$ of Fig. 3, Fig. 3 is a plan view, and, Fig. 4 is a view in elevation of the machine, at right angles with that shown in Fig. 1.

Similar numerals refer to similar parts throughout the several views.

In carrying out my invention, I employ a suitable upright supporting frame comprising a pair of vertical standards 1, the upper sides of which are bridged by a horizontal frame base 2. Rising at intervals from the upper side of the supporting frame, are bearing brackets 3 in which are pivotally mounted supporting wheels or rollers 4. Upon these rollers is movably supported the inner wall of a channeled baking ring 5, the closed side 5ª of which is uppermost, as shown. Rising from the horizontal top member 2 of the supporting frame centrally of said frame is a fixed vertical pin or shaft 6, upon which are journaled the central portions of connected radially arranged cross frame bars 7, the outer ends of the latter connecting with the inner and upper portion of the channeled baking ring 5. By thus pivoting the frame members 7 upon the shaft or pin 6, it is obvious that the baking ring 5 will be free to rotate about said shaft. At desirable intervals on the inner side and upper portion of the baking ring, I provide fixed brackets 8, in each pair of which is pivoted the outer portion of an inwardly extending lever or handle-like extension 9ª of a baking plate 9, these baking plates being adapted to lie horizontally adjacent to each other upon the upper surface of the baking ring 5, which surface as indicated more clearly in Fig. 3 of the drawing, is preferably corrugated.

It will be noted that the brackets 8 are provided with upwardly opening pockets or journals. This special formation has two definite functions. The first of these is that, while the rear end of each plate is hinged to its bracket, the said rear end is permitted to have a slight upward movement by way of automatic adjustment when it settles into operative position upon the batter. By this means, it becomes possible to produce a finished product which is of the same thickness throughout inasmuch as the upper plate naturally assumes a parallel relation to the working surface of the baking ring. It will further be seen that this automatic capability of adjustment will permit of a more ready regulation of the thickness of the finished product, this being done by the provision of different weights of upper baking plates. The second function of this pocket hinge structure, resides in the fact that the upper plate elements are readily removable. The first of these features is of extreme importance, since the formation of the batter with one thin edge, inevitably renders the product inferior. Thus it will be seen that, after the batter is deposited upon the lower baking plate or ring, the hinged baking plate is lowered and settles upon the batter. When initially lowered, the surface near the inner edge of the hinged plate is too close to the ring in comparison with the remaining surface of the baking plate. However, the tendency of the batter to rise is sufficient to raise this inner edge until there is an even disposition of the surface of the hinged plate relative to the surface of the ring. As before stated, this is made possible by the peculiar form of hinge structure which permits this compensating movement after lowering of the hinged plate.

The radially arranged levers or handle-like extensions 9ª of the baking plates are, as shown, slightly inclined from their pivot points and provided with horizontal terminal portions. The outer side of each of the baking plates 9 is formed with an outwardly projecting finger-lug 9ᵇ which when the baking plates are in their horizontal positions on the baking ring, project beyond the periphery of the latter.

Suitably supported from the top of the supporting frame and within the circle formed by the central opening of the baking ring, is a channeled cam bracket 10, the greater portion of which lies horizontally and parallel with the inner vertical wall of the baking ring 5. Toward one end, however, this channeled bracket or cam member is inclined upwardly and inwardly, as indicated more clearly at 10ª in Figs. 2 and 3.

11 represents a horizontal shaft which extends from the outer side of the machine to a point above the central portion of the supporting frame and below the baking ring. This shaft is provided with suitable bearings 11ª and on its outer end carries a gear wheel 12. On its inner end the shaft 11 carries a disk 13 and at a point beneath the outer portion of the baking ring, said shaft carries a pinion 14, the teeth of which mesh with those of a circular rack 15 which is formed with or carried by the outer portion of the baking ring 5. The face of the disk 13 has projecting eccentrically therefrom a pin 16 which engages an elongated slot 17 in the central portion of the inclined trip lever 18. The lower end of this trip lever is pivoted at 19 to a bracket 20 which depends from the frame member 2 toward one side of the supporting frame. The upper end portion of the trip lever 18 has a spoon-like termination 18ª, the underside of which is adapted when the upper portion of said trip lever is swung downward, to engage the upper side of and depress an opposing handle extension 9ª of a baking plate 9, this operation being more clearly set forth hereinafter.

On the inner side of the gear wheel 12, the shaft 11 carries a cam wheel 21, which is provided with an irregular peripheral groove 22 with which groove engages the lower end of an upwardly extending and inclined rod 23, the bifurcated terminal portion of which is connected with the outer end of a piston rod 24 which is mounted to reciprocate within a suitable batter supply pump cylinder 25, this pump cylinder being provided with the usual batter inlet pipe 26 and an inner end outlet opening for discharging batter at each inward movement of the piston rod, on to the upper side of the baking ring. The construction and operation of this pump, however, are not herein described in detail or claimed, for the reason that the means of discharging batter on to the baking ring, is not at this time a part of my invention and as the batter may be applied to the baking ring by hand or by the use of a suitable form of discharging pump, such as that shown in the pending application of myself and Carl R. Taylor, Serial Number 521,341, filed Oct. 6, 1909.

At a suitable point on the outside and adjacent to the upper portion of the baking ring 5, I support a short inclined lug 27, the upper portion of which projects slightly above the baking ring.

Carried by frame members 28 which lead from the upper end of the stationary shaft 6, is a curved heat casing 29 of channel form, which extending slightly above the baking ring 5, covers preferably about three-fourths of said baking ring. From this heat casing, rise at intervals, outlet pipes 30. Within the heat casing is supported a curved gas conducting and burner pipe 31, the latter being formed with burner openings in its upper side. This gas pipe is supplied with gas from a pipe arm 32 which extends from the casing 29 downward and is connected through a suitable mixer 33 with a gas supply pipe 34. Within the baking ring 5, I provide a circular gas burner 35 which is supported on suitable brackets 36 which rise from the frame top 2. This gas burner 35 is connected through a pipe 36 with a gas supply pipe 37.

38 represents a horizontal shaft which is journaled in the frame members 1 and which on its outer end carries a power belt wheel 39 which is adapted to receive a belt from a suitable source of power. This shaft 38 carries within the framework a belt cone or tapering belt wheel 40. 41 also represents a horizontal shaft which is journaled in the lower portions of the frame standards 1 and this shaft also carries a belt cone which is indicated at 42. On its outer end the shaft 41 carries a belt wheel 43, over which passes a belt 44, the latter running over a belt wheel 45 which is mounted upon the stub shaft 46 projecting from the supporting frame above the belt wheel 43. This stub shaft carries on its outer end a pinion 46ª, the teeth of which mesh with the gear wheel 12 heretofore described. The outer portion of the stub shaft 46 has a fixed connection with a clutch collar 47 and between the latter and the wheel 45, said stub shaft has keyed to slide thereon a clutch sleeve 48, the latter being provided with the usual form of operating lever 49 by the inward or outward movement of which the teeth of the clutch sleeve are thrown out of or into engagement with the corresponding recesses of the clutch member 47.

A belt 50 connects the two cones 40 and 42 and in operation, it will be understood that power transmitted to the belt wheel 39, its shaft 38 and cone 40, will be transmitted through a belt 50 to the cone 42, its shaft 41 and belt wheel 43. Through the rotation of the belt wheel 43 a desirable rotary movement is imparted to the wheel 45 and assuming that the clutch member 48 is thrown into engagement with the clutch member 47, this rotary motion will be contributed to the pinion 46 and thence to the gear wheel 12. The rotation of the gear wheel 12 thus imparted, results in the rotation of the shaft 11 and through the engagement of the pinion 12 with the rack 15, in the rotation of the baking plate 5. In the rotary movement of the baking ring, it is obvious that the batter which is contained between the plates 9 and the upper surface of the baking ring, will be subjected to the heat from the upper burner 31 and the lower burner 35, thus insuring a proper degree of heat being applied to both the upper and lower side of the batter. As one of the upper baking plates 9 approaches the end of a complete revolution, it will be understood that its lug 9ᵇ will by contact with the inclined lug 27, be slightly raised, thus providing an initial separation of the upper baking member 9 from the baked product. At the same time, the terminal portion of the lever extension or finger 9ᵃ of the baking plate, which has been as described, slightly elevated from the cake or baked product, is depressed through the downward swinging movement of the lever 18, said lever operating in its downward movement to brace the lower end portion of the baking plate extension 9ᵃ into the mouth of the channel member 10. As the baking plate extensions thus successively are pressed into engagement with said channel member, it is obvious that the latter will serve to hold the upper baking plates 9 in the elevated or raised positions until the extensions 9ᵃ of the baking plates pass upward and outward through the opposite end portion 10ᵃ of the channel member 10. As each plate thus receives its first elevation, the baked product is removed from the upper side of the baking ring and when the upper side baking plate, still in the elevated position, reaches a point opposite the discharge end of the pump 25, a predetermined quantity of batter is applied to the baking ring through either said pump cylinder or otherwise. As the baking ring extension then passes out of the upwardly inclined portion 10ᵃ of the channel member 10, it is obvious that said baking plate will drop downward to its normal position over the quantity of batter which has been deposited upon the baking ring. By this operation, it will readily be understood that the baked products may be successively removed from the baking ring through the automatic raising of the upper baking plates and that these baking plates will successively be returned to their lowered positions upon the newly applied batter.

Heretofore means have ordinarily been provided in machines of this class, whereby two hinged baking plates have been employed for each portion of batter and the heat being applied from the lower side only. Means have also been provided for the automatic inversion of the baking plates. By the construction which I have described, it is obvious that the necessity of inverting the baking plates is obviated, inasmuch as heat is supplied from both below and above.

It will readily be understood that the rate of speed at which the baking ring moves, may be varied by shifting the belt 50 to different positions upon the cones 40 and 42 and in order to accomplish this, I have provided an ordinary belt shifting bar such as is indicated at 51, this bar being slidably mounted in a fixed frame arm 52 and said bar being provided with the usual fingers 53 adapted to embrace opposite edges of the belt 50.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is—

1. A baking machine comprising a rotatable element, hinged plates carried thereby, means for maintaining said plates in elevated position during a determinate period of the rotation, and independent means for initially elevating said plates.

2. A baking machine comprising a rotatable element, hinged plates carried thereby, means for maintaining said plates in elevated position during a determinate period of the rotation, and independent means for initially elevating said plates in successive steps.

3. A baking machine comprising a rotatable element, hinged plates carried thereby, means for maintaining said plates in elevated position during a determinate period of the rotation, and independent means for initially elevating said plates in successive steps, said means comprising relatively independent units.

4. A baking machine comprising a rotatable element, hinged plates carried thereby, means for maintaining said plates in elevated relation during a determinate period of the rotation and a lever for automatically moving said plates into subjection to said means.

5. A baking machine comprising a rotatable element, hinged plates carried thereby, means for maintaining said plates in elevated position during a determinate period of the rotation, a lever for automatically moving said plates into subjection to said means, and a means for slightly raising said plates just preceding movement by said levers.

6. A baking machine comprising sectional traveling baking units, means for maintaining the sections of said traveling units separated for a determinate interval in the period of travel, and independent mechanism for initially separating said sections.

7. A baking machine comprising sectional traveling baking units, means for maintaining the sections of said units separated for a determinate interval in the period of travel and independent mechanism for separating said sections in successive steps prior to the operation of said means.

8. In a machine of the character described, the combination with a supporting frame, and a baking ring rotatably mounted on said frame and having a rack on its lower side, of a plurality of baking plates hinged in connection with said baking ring, a fixed channel member within the circle of said baking ring and having an upwardly inclined termination, a shaft journaled beneath said baking ring, a disk on said shaft, a pivoted lever eccentrically fulcrumed on said disk adapted to successively engage and elevate said hinged baking plates, a pinion wheel carried by said shaft and engaging said rack, and means for operating said shaft.

9. A baking machine comprising a rotatable baking ring, hinged plates carried thereby and forming closed pans with said ring, a hood superposed above a portion of said ring, heating means within said hood, and heating means within said ring, said two heating means serving to heat each of the said pans from both sides throughout passage under said hood.

10. A baking machine comprising a rotatable baking ring, hinged plates carried thereby and forming closed pans with said ring, a hood superposed above a portion of said ring, heating means within said hood, heating means within said ring, said two heating means serving to heat each of the said pans from both sides throughout passage under said hood, and means for elevating said plates after passage from beneath said hood.

11. A baking machine comprising a rotatable baking ring, hinged plates carried thereby and forming closed pans with said ring, a hood superposed above a portion of said ring, heating means within said hood, heating means within said ring, said two heating means serving to heat each of the said pans from both sides throughout passage under said hood, means for elevating said plates after passage from beneath said hood, and means for elevating said plates by a combined cam and leverage action, and means for elevating said plates by an initial cam action, a subsequent leverage and a still subsequent cam action.

12. A baking machine comprising a rotatable baking ring having its baking surface formed substantially in one continuous horizontal plane, a hood superimposed over a portion of said ring, hinged plates carried on said ring, and heating means.

13. A baking machine comprising baking units formed of relatively separable plate members and hinge members constructed to permit of a relative spreading action.

14. A baking machine comprising baking units formed of relatively separable plate members, a pocket hinge element, and a pintle hinge element complemental thereto, said pocket hinge element being open at one side to permit relative spreading and segregation of said elements.

In testimony whereof I affix my signature in presence of two witnesses.

WERD W. TURNBULL.

Witnesses:
SILVIO PAIRIS,
ELIZABETH GORLY.

DISCLAIMER.

1,009,355.—*Werd W. Turnbull*, Columbus, Ohio. BAKING-MACHINES. Patent dated November 21, 1911. Disclaimer filed September 19, 1914, by *The Turnbull Manufacturing Company*, assignee.

Enters this disclaimer—

"To that part of page 1, lines 18, 19, and 20 of the body of said specification, which is in the following words, to wit:

"to provide improved means for automatically raising and lowering the movable baking plates.

"and to claims 1 to 8, inclusive, which are in the following words, to wit:

"1. A baking machine comprising a rotatable element, hinged plates carried thereby, means for maintaining said plates in elevated position during a determinate period of the rotation, and independent means for initially elevating said plates.

"2. A baking machine comprising a rotatable element, hinged plates carried thereby, means for maintaining said plates in elevated position during a determinate period of the rotation, and independent means for initially elevating said plates in successive steps.

"3. A baking machine comprising a rotatable element, hinged plates carried thereby, means for maintaining said plates in elevated position during a determinate period of the rotation, and independent means for initially elevating said plates in successive steps, said means comprising relatively independent units.

"4. A baking machine comprising a rotatable element, hinged plates carried thereby, means for maintaining said plates in elevated relation during a determinate period of the rotation and a lever for automatically moving said plates into subjection to said means.

"5. A baking machine comprising a rotatable element, hinged plates carried thereby, means for maintaining said plates in elevated position during a determinate period of the rotation, a lever for automatically moving said plates into subjection to said means, and a means for slightly raising said plates just preceding movement by said levers.

"6. A baking machine comprising sectional traveling baking units, means for maintaining the sections of said traveling units separated for a determinate interval in the period of travel, and independent mechanism for initially separating said sections.

"7. A baking machine comprising sectional traveling baking units, means for maintaining the sections of said units separated for a determinate interval in the period of travel and independent mechanism for separating said sections in successive steps prior to the operation of said means.

"8. In a machine of the character described, the combination with a supporting frame, and a baking ring rotatably mounted on said frame and having a rack on its lower side, of a plurality of baking plates hinged in connection with said baking ring, a fixed channel member within the circle of said baking ring and having an upwardly inclined termination, a shaft journaled beneath said baking ring, a disk on said shaft, a pivoted lever eccentrically fulcrumed on said disk adapted to successively engage and elevate said hinged baking plates, a pinion wheel carried by said shaft and engaging said rack, and means for operating said shaft."

[*Official Gazette, September 29, 1914.*]